(12) United States Patent
Baumgartner

(10) Patent No.: US 8,578,998 B2
(45) Date of Patent: Nov. 12, 2013

(54) ADHESIVE BONDING APPARATUS

(75) Inventor: Robert Anton Baumgartner, Traun (AT)

(73) Assignee: Wilhelm Anger, Salzburg (AT)

( * ) Notice: Subject to any disclaimer, the term of this patent is extended or adjusted under 35 U.S.C. 154(b) by 276 days.

(21) Appl. No.: 13/031,585

(22) Filed: Feb. 21, 2011

(65) Prior Publication Data

US 2012/0048469 A1     Mar. 1, 2012

(30) Foreign Application Priority Data

Feb. 19, 2010    (EP) .................................... 10154069

(51) Int. Cl.
*B32B 37/00*    (2006.01)
(52) U.S. Cl.
USPC .......................................... 156/538; 156/349
(58) Field of Classification Search
USPC ................................................. 156/538, 349
IPC ....................................................... B32B 37/00
See application file for complete search history.

(56) References Cited

U.S. PATENT DOCUMENTS

| | | | |
|---|---|---|---|
| 4,049,254 A * | 9/1977 | Godot .......................... | 269/156 |
| 6,561,738 B1 * | 5/2003 | Fujita et al. ................... | 408/97 |
| 7,320,516 B2 * | 1/2008 | Kroman et al. ............... | 351/178 |

FOREIGN PATENT DOCUMENTS

| | | |
|---|---|---|
| EP | 1 238 731 A1 | 11/2002 |
| EP | 2 019 331 A1 | 1/2009 |
| WO | 2004 096496 A1 | 11/2004 |
| WO | WO 2004096496 A1 * | 11/2004 |

* cited by examiner

*Primary Examiner* — Philip Tucker
*Assistant Examiner* — Shawn F Hogan
(74) *Attorney, Agent, or Firm* — Baker Hostetler LLP

(57) ABSTRACT

An apparatus for adhesively bonding a spectacle lens to connecting elements of a bridge and a lug of the spectacles is disclosed. The apparatus includes a frame and a holding device for holding the lens. The holding device includes a cylindrical holding pin designed to centrally hold the lens such that a front side of the lens extends substantially perpendicularly to an axis of the cylindrical holding pin. At the frame, two straight supporting strips extend in parallel to each other at a plane perpendicular to the pin axis and are equally spaced apart from the pin axis. The two supporting strips are arranged such that the front side of the lens held by the holding pin faces the supporting strips and one of the connecting elements is adapted to be clamped between the front side of the lens and each of the supporting strips.

6 Claims, 4 Drawing Sheets

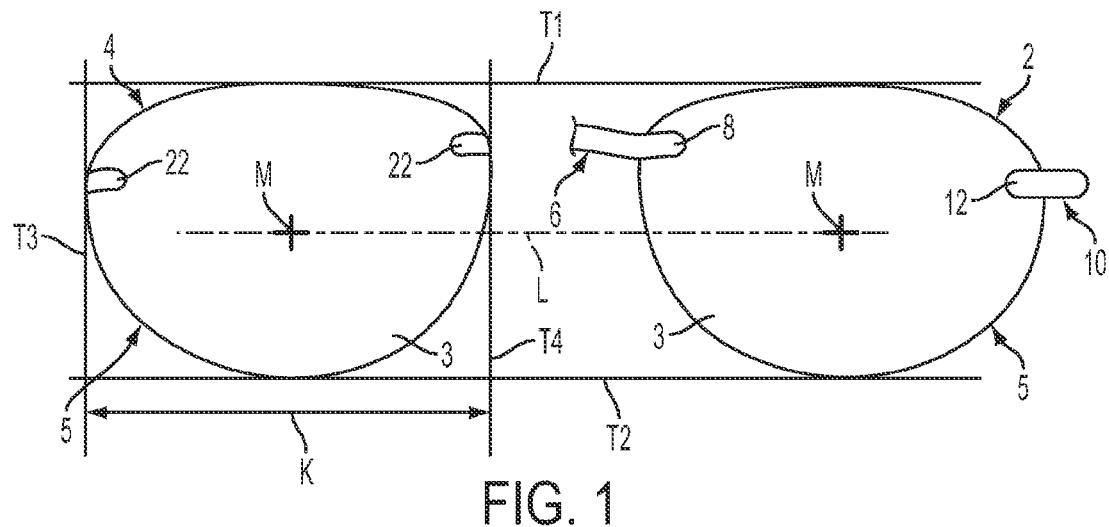
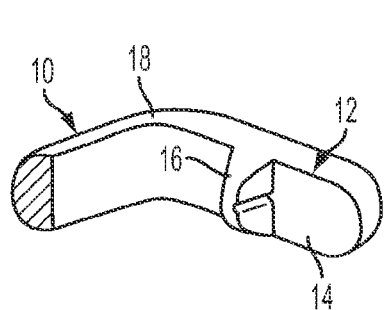
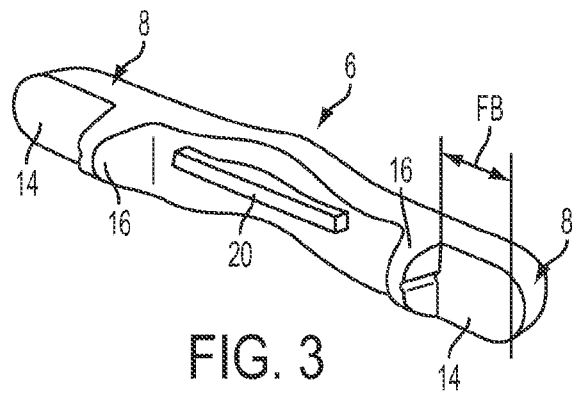

ADHESIVE BONDING APPARATUS

CROSS-REFERENCE TO RELATED APPLICATIONS

This application claims priority to foreign Patent Application EP 10 154 069.8, filed on Feb. 19, 2010, the disclosure of which is incorporated herein by reference in its entirety.

FIELD OF THE INVENTION

The invention relates to an apparatus for adhesively bonding of a spectacle lens of rimless spectacles to connecting elements of a bridge and a lug of the rimless spectacles.

BACKGROUND OF THE INVENTION

A method of manufacturing rimless spectacles is known in which connecting elements of the lugs and the bridge of the spectacles are adhesively bonded to the front sides of the lenses. In this known method initially two lens blanks onto the front and rear sides of which a coating is applied are manufactured of plastic material. The two coated lens blanks are ground in such way that two spectacle lenses having a desired lens shape are obtained. At predetermined mounting positions for the connecting elements of the lugs and the bridge on the front side of the lenses the coating is removed for forming joining surfaces which substantially correspond, as to their shape and dimensions, to joining surfaces formed at the connecting elements. The connecting elements are then adhesively bonded to the front side of the lenses at the mounting positions. Since in the area of the joining surfaces at the lenses the base material thereof is exposed, a permanently tight adhesive bond can be produced between the connecting elements and the lenses.

An apparatus for adhesively bonding the lenses to the connecting elements of the bridge and the lugs applicable to the afore-illustrated method is also known. This device includes a frame in the form of a mounting plate as well as holding devices with the aid of which the two lenses of the spectacles to be manufactured are fixed to the mounting plate. The front side of the respective lens faces away from the mounting plate so that the joining surfaces formed on the front sides of the lenses are exposed. It is provided in this context that initially the respective connecting element is arranged at and pressed against the associated mounting position, before adhesive is introduced between the joining surface at the lens and the joining surface at the connecting element. Until the initial adhesion is reached, the connecting element and the lens are pressed against each other. If the connecting element is pressed manually or by means of a hand-held tool, the quality of the adhesive bond is considerably dependent on the skills of the person performing the adhesive bonding.

SUMMARY OF THE INVENTION

Embodiments of the present invention advantageously provide an apparatus for adhesively bonding of a spectacle lens of rimless spectacles to connecting elements of a bridge and a lug of the rimless spectacles which has a simple design, permits easy handling and further allows to reliably produce permanently tight adhesive bonds.

The apparatus according to one embodiment of the invention includes the two straight supporting strips parallel to each other that are arranged on both sides of the holding pin. The holding pin is designed to hold the lens centrally such that the front side thereof extends substantially perpendicularly to the pin axis and faces the supporting strips. Since the holding pin is arranged to be rotatable and axially movable in the bore receiving the same, the lens held by the holding pin can be rotated about the pin axis and the distance between the front side of the lens and the supporting strips can be varied. This permits to rotate the lens to such rotary position that the joining surfaces formed on the front side of the lens coincide with the supporting strips and that, at this rotary position, the respective connecting element is inserted between the associated joining surface at the lens and the supporting strip and is clamped between the front side of the lens and the supporting strip. While the connecting element is clamped in this way, the adhesive can be introduced between the joining surfaces provided at the lens and at the connecting element; whereupon the connecting element continues being held in a clamped state until the initial adhesion is reached. This adhesive bonding operation requires no manipulations at the connecting element after clamping the connecting element between the front side of the lens and the supporting strip and allows the manufacture of high-quality adhesive bonds with great reliability.

BRIEF DESCRIPTION OF THE DRAWINGS

Hereinafter the invention will be illustrated in detail by way of an embodiment with reference to the drawings, in which:

FIG. 1 shows a front view of two lenses as well as further elements of an embodiment of rimless spectacles for the manufacture of which the apparatus according to an embodiment of the invention can be employed;

FIG. 2 is a perspective view of a left lug of the spectacles according to FIG. 1;

FIG. 3 is a perspective view of a bridge of the spectacles according to FIG. 1;

DETAILED DESCRIPTION

Figure 4:
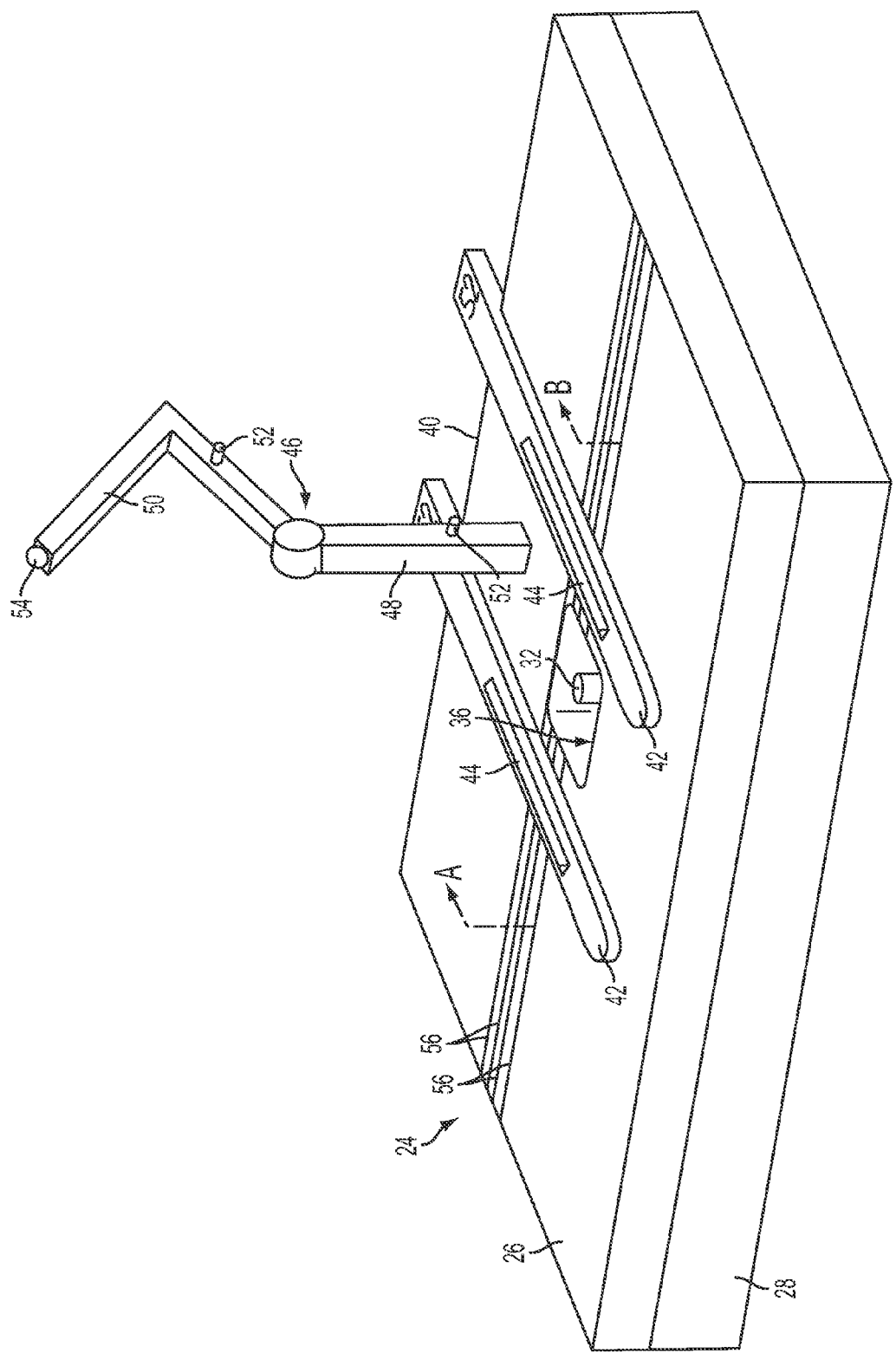
FIG. 4 schematically shows a perspective view of an embodiment of the apparatus according to the invention.

Hereinafter first an embodiment of rimless spectacles shall be described by way of FIGS. 1 to 3 for the manufacture of which the apparatus according to the invention can be applied. FIG. 1 shows two lenses as well as further elements of rimless spectacles when viewed from the front. The spectacles comprise a left lens 2, a right lens 4 and a bridge 6 disposed between the two lenses from which merely the left half is represented in FIG. 1. In the present explanation of the spectacles the terms "left" and "right" refer to the corresponding indications concerning the human head. Accordingly, for instance the left lens 2 is associated with the left eye and is shown on the right in FIG. 1. Each of the two lenses 2 and 4 has a front side 3 visible in FIG. 1, a rear side not visible in FIG. 1 facing the respective eye of the wearer with the spectacles put on and a circumferential edge 5 radially outwardly delimiting the lens, related to its geometric center M. The bridge 6 is an elongate element disposed between the two lenses 2 and 4 and interconnecting the same, and at each of its two ends includes a connecting element 8 adhesively bonded to the front side 3 of the lenses 2 and 4, respectively, visible in FIG. 1. The spectacles further include a left lug 10 and a right lug not shown in FIG. 1. Each of the lugs is fastened to a marginal area of the lenses 2 and 4, respectively, facing away from the bridge 6. For this purpose, each of the two lugs has at its front end a connecting element 12 adhesively bonded to the front side 3 of the lenses 2 and 4, respectively. The lugs are articulated to a sidepiece of the spectacles not shown in FIG. 1.

FIG. 2 illustrates in a perspective view, when viewed slanted from above and behind, the left lug 10 with its connecting element 12 in an enlarged and cut-out fashion. In the shown embodiment the lugs and the bridge 6 including their respective connecting elements 8 or 12 are made of plastic material adapted to be extrusion-molded. The connecting element 12 of the left lug 10 is substantially block-shaped and has on its rear side the joining surface 14 visible in FIG. 2 which is substantially plane and has a rectangular shape one side of which is rounded, as shown in FIG. 2. The joining surface is designed to be adhesively bonded to a complementary joining surface on the front side 3 of the left lens 2. The connecting element 12 further comprises a projection 16 disposed adjacent to the joining surface 14 and extending to the rear which is designed to contact the edge 5 of the lens 2. The connecting element 12 of the lug 10 merges into or is connected to a curved portion 18 of the lug 10 connecting the connecting element 12 to the joint not shown at which the lug 10 is connected to the left sidepiece of the spectacles not shown.

The foregoing explanation of the left lug 10 applies mutatis mutandis also to the right lug of the spectacles not shown.

FIG. 3 illustrates the bridge 6 enlarged in a perspective view when viewed slanted from above and behind. As regards the configuration of the connecting elements 8 of the bridge 6, the foregoing explanation of the connecting element 12 of the lug 10 is applicable. Accordingly, each of the two connecting elements 8 of the bridge 6 includes the joining surface 14 and the projection 16 arranged adjacent thereto. In the central portion of the bridge 6 a rail 20 is formed integrally with the latter with the aid of which a pad member that is not shown can be mounted to the bridge 6, the pad member serving for supporting the spectacles at the wearer's nose.

In the afore-described embodiment of rimless spectacles the bridge including its two connecting elements and the lugs including their connecting element are parts that are integrally injection-molded of a plastic material. Deviating from this, the respective connecting elements 8 and 12, on the one hand, and the other portions of the bridge 6 and of the two lugs, on the other hand, can consist of materials different from each other and can have been interconnected before adhesively bonding the connecting elements to the spectacle lenses or can be interconnected after adhesively bonding the connecting elements to the spectacle lenses only. It is possible, for instance, to connect the respective connecting element by injection-molding to the remaining portion of the bridge or lug during an injection-molding process and to partly or completely cover the remaining portion with the material of the connecting element. Irrespective of the remaining configuration and the manufacturing method of the bridge and the lugs, it is essential that at the respective connecting element the substantially plane joining surface 14 is formed which is designed to be tightly bonded to a complementary joining surface on the front side of either of the two lenses.

Each of the two lenses 2 and 4 usually has been made of a coated lens blank having a circular edge. On its front side and its rear side the lens blank is provided with a coating which usually consists of plural layers and is to ensure scratch resistance and/or influence on the reflection properties and/or dirt-repelling properties of the surfaces of the lens.

The geometric shape of the edge 5 of the two lenses 2 and 4, when viewed from the front (or from behind), is referred to as lens shape. Numerous different lens shapes are known and possible in rimless spectacles. FIG. 1 shows the spectacle lenses 2 and 4 having merely one of the numerous possible and known lens shapes. Each lens has a geometric center M which coincides—when viewing the lens from the front or the rear—with the center of a square referred to as box. This box is defined by an upper tangent T1 to the edges of the two lenses 2 and 4, a lower tangent T2 to the edges of the two lenses 2 and 4 as well as an outer tangent T3 and an inner tangent T4 to the edge of the lens, with the tangents T3 and T4 extending perpendicularly to the tangents T1 and T2 (cf. FIG. 1). The maximum width of a lens, i.e. the distance between the tangents T3 and T4 is referred to as A-dimension K of the lens. Depending on the design of the glasses and the dimensions of the wearer's head, the required and desired maximum width of a lens can differ from glasses to glasses. Maximum widths of 48 mm, 50 mm, 52 mm, 54 mm and 56 mm are common. They correspond to an A-dimension K of 48, 50, 52, 54 and 56.

In order to manufacture the lenses 2 and 4 with the desired lens shape, for instance the one shown in FIG. 1, usually a lens holder also referred to as block or adhesive block is detachably bonded to the front side of the lens blank, wherein an axis of rotation of the lens holder extends perpendicularly through the front side of the lens blank and through the geometric center M of the predetermined lens shape of the lens to be manufactured. While the lens blank is rotated about the axis of rotation of the lens holder, starting from the edge of the lens blank so much material is removed from the same by grinding dependent on the rotational position of the lens blank that the lens having the desired lens shape is obtained.

As already described before, the bridge and the lugs of the spectacles are adhesively bonded to the lenses 2 and 4. For this purpose, on the front sides 3 of the lenses 2 and 4 joining surfaces are formed, wherein a respective joining surface 22 is provided for each of the joining surfaces 14 of the connecting elements 8 and 21. In FIG. 1 merely at the right lens 4 out of said joining surfaces 22 the joining surface for the right connecting element 8 of the bridge 6 and the joining surface for the connecting element of the right lug are shown. Similar joining surfaces are formed at the left lens 2, wherein they are covered by the bridge 6 and the left lug 10 in FIG. 1. The joining surfaces 22 at the lenses 2 and 4 substantially correspond, as to shape and dimensions, to the joining surfaces 14 at the connecting element 8 or 12 bonded to the respective joining surface 22. That is to say, in other words, that the joining surfaces 14, on the one hand, and the joining surfaces 22, on the other hand, are configured to be complementary to each other. The joining surfaces 22 have been formed at the lenses 2 and 4 by the fact that in the area of the joining surfaces to be formed the coating has been removed on the front side of the respective lens completely, i.e. at least up to the entire thickness of the coating. The purpose of removing the coating consists in exposing the base material of the lenses so that the respective joining surface 22 at the lens has the material constitution of the base material of the lens. This is the prerequisite for producing a permanently tight adhesive bond between the connecting elements and the lenses.

The joining surfaces 22 on the front side of the lenses 2 and 4 start out from the edge 5 of the lens or, in other words, extend to said edge. The location of each joining surface 22 at the lenses 2 and 4 is predetermined by the design of the spectacles and the lens shape of the lenses 2 and 4. The distance of each joining surface 22 from a center line L connecting the two geometric centers M is substantially equal to the distance of the contact point of the tangents T3 and T4, respectively, from said center line L. That is to say, in other words, that the horizontal distance measured in the direction of the center line L between the two joining surfaces 22 of each of the two lenses 2 and 4 is always the same for one and the same A-dimension K irrespective of the lens shape, while the vertical distance of the joining surfaces 22 of a lens from the center line L can vary with the lens shape.

Figure 5:
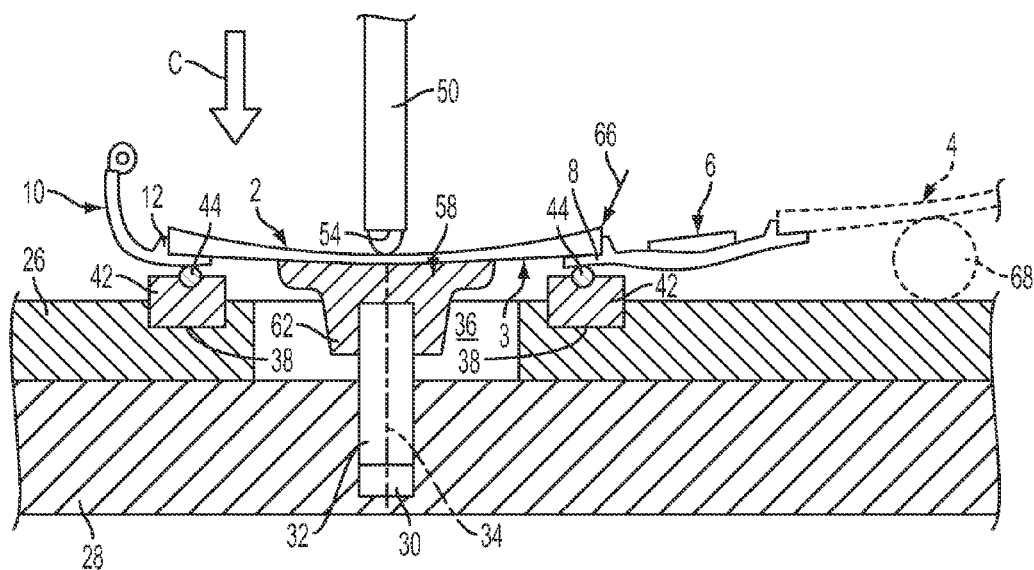
FIG. 5 is a cut-out representation of the apparatus according to FIG. 4 in a section according to A-B of FIG. 4.
Figure 6:
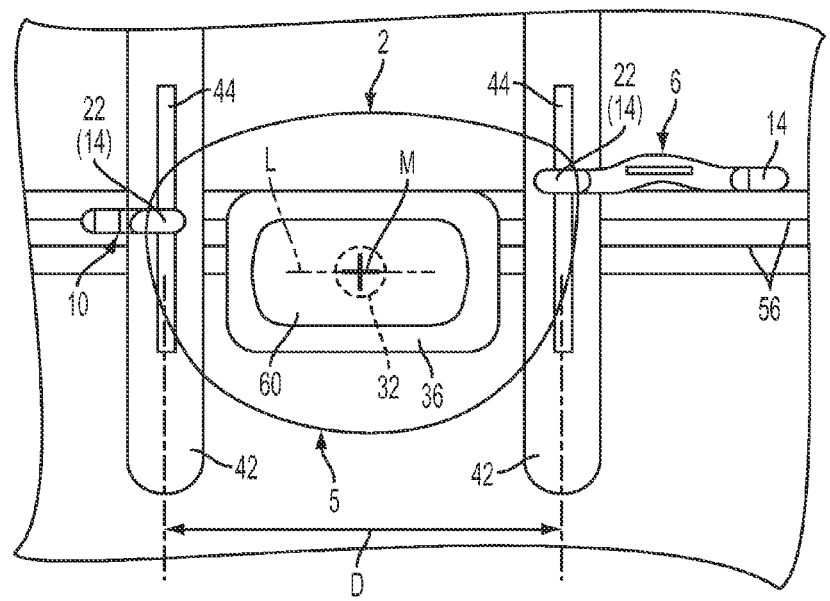
FIG. 6 is a cut-out top view onto the apparatus according to FIG. 4 when viewed in the direction C of FIG. 5.

Hereinafter, especially with reference to the FIGS. 4 to 6, an embodiment of the apparatus according to the invention shall be explained. This apparatus serves for adhesively bonding of the lenses and the connecting elements of rimless spectacles of the type described in the foregoing by way of the embodiment according to the FIGS. 1 to 3. FIG. 4 schematically shows the embodiment in a perspective representation when viewed slanted from above. FIG. 5 is a cut-out and enlarged sectional view according to A-B of FIG. 4, wherein FIG. 5 illustrates the apparatus at its position of use in connection with a lens, a lug and the bridge of the spectacles to be manufactured. FIG. 6 is a top view relating to FIG. 5 when viewed in the direction C, in FIG. 6 a hold-down member shown in FIG. 5 at its working position being omitted. The elements of the spectacles to be manufactured shown in FIGS. 5 and 6 are elements of the embodiment of rimless spectacles afore-described by way of the FIGS. 1 to 3. These elements are provided with the same reference numerals as in the FIGS. 1 to 3 and are not explained again in the following, as the above explanations are applicable to them. In FIG. 6 within the edge 5 of the left lens 2 parts and elements are shown which are provided on the front side of the lens 2, i.e. are viewed through the lens 2 when viewing in the direction C in FIG. 5.

The shown apparatus comprises a frame 24, wherein in this case the term "frame" designates a base member of the apparatus that can also be referred to as base or casing. In the shown embodiment the frame 24 is box-shaped and the frame 24 is formed by an upper rectangular plate 26 and a lower rectangular plate 28 which are superimposed and are fastened to each other. For the purpose of the following description, the upper side of the upper plate 26 visible in FIG. 4 is deemed to be a horizontally aligned working surface and accordingly "vertically" denotes an extension perpendicularly to said horizontal working surface. In the lower plate 28 and thus in the frame 24 a vertically extending bore 30 is formed in which a cylindrical holding pin 32 is seated such that it is rotatable about its pin axis 34 in the bore 30 and is axially movable in the bore 30. The holding pin 32 is designed to hold a spectacle lens in a manner described further below.

Furthermore, in the upper plate 26 and thus in the frame 24 above the bore 30 a recess 36 is formed which is open to the top. The holding pin 32 inserted in the bore 30 projects from the bottom approximately centrally into the recess 36 surrounding the upper free end of the holding pin 32.

In the upper plate 26 and thus in the frame 24 two straight grooves open to the top and having a rectangular profile are formed, each forming a recess 38. In the shown embodiment, the two recesses 38 extend on both sides of the pin axis 34 to the rear edge 40 (cf. FIG. 4) of the upper plate 26. A carrier 42 having the form of an elongate block and projecting at the rear edge 40 of the upper plate 26 from the latter is inserted fittingly and detachably into each of the two recesses 38, as shown in FIG. 4.

Each of the two carriers 42 is provided with a supporting strip 44 on its upper side. The two supporting strips 44 serve for supporting the connecting elements during adhesively bonding a lens to the connecting elements and the carriers 42 serve for carrying the supporting strips 44. The two supporting strips 44 are formed by a respective elongate straight element and extend in parallel to each other. Each supporting strip 44 is either formed integrally with its carrier 42 or is mounted to the same. In the illustrated embodiment each supporting strip 44 is formed by a rod made of hard rubber. Each supporting strip 44 preferably consists of a material entailing as high adhesion as possible to the respective connecting element, when the latter is slightly pressed to the supporting strip 44. When the supporting strips 44 are in contact with the lens and the connecting elements, the supporting strips 44 are intended not to scratch or otherwise damage the lens or the connecting elements. Accordingly, the supporting strips 44 should not be too hard. Each supporting strip 44 has a cross-sectional profile which is rounded at least in the area of the upper side of the supporting strip 44.

The two supporting strips 44 are carried by the carriers 42 inserted in the recesses 38 such that the upper edges of the supporting strips 44 parallel to each other extend in a plane perpendicular to the pin axis 34 and have equal distances from the pin axis 34.

The apparatus is further provided with a hold-down member 46. The latter comprises a column 48 mounted to the frame 24 and a two-leg pivot arm 50 articulated to the column 48. A tension spring not shown is tensioned between two hinging points 52 of the hold-down member 46 and holds the pivot arm either in the idle position shown in FIG. 4 or in a working position in which the free leg of the pivot arm 50 extends substantially in extension of the pin axis 34, as shown in FIG. 5. An elastic element 54 is pressed downward at the free end of the pivot arm 50 by virtue of the force of the spring not shown.

On or in the upper side of the upper plate 26 four straight auxiliary lines 56 parallel to each other are formed which extend perpendicularly to the direction of extension of the two supporting strips 44. Said auxiliary lines are not absolutely necessary, to be sure; however, they facilitate working with the apparatus which is why at least one such auxiliary line is preferably provided.

Hereinafter a bonding operation performed by means of the afore-described apparatus is explained, wherein it is described in which way the left lens 2 is adhesively bonded to the connecting element 12 of the left lug 10 as well as to one of the connecting elements 8 of the bridge 6 of the rimless spectacles in accordance with the afore-described embodiment.

First of all, the lens 2 which exhibits the desired lens shape and the A-dimension K and at which the two joining surfaces 22 are formed is detachably connected to the holding pin 32. This can be performed as follows. When at this time the lens 2 is still connected to the lens holder to which it was connected for the purpose of the afore-described grinding of the lens shape and when said lens holder has a blind hole coaxial with respect to its axis of rotation, the free end of the holding pin 32 is put into the blind hole or, in other words, the lens holder is pushed onto the free end of the holding pin 32 so that the holding pin 32 and the lens holder are interconnected by a releasable force fit. A lens holder which permits this is known per se and is schematically represented in FIGS. 5 and 6. The shown lens holder 58 consists of an elastic material and includes a substantially oval plate detachably bonded to the front side 3 of the lens 2 as well as a pintle 62 in which the afore-mentioned blind hole is formed. On the afore-mentioned conditions a configuration is resulting in which the pin axis 34 extends across the geometric center M and perpendicularly to the front side 3 of the lens 2, as this is shown in the FIGS. 5 and 6. Accordingly, the holding pin 32 holds the lens 2 centrally such that the slightly curved front side of which extends substantially perpendicularly to the pin axis 34.

Figure 8:
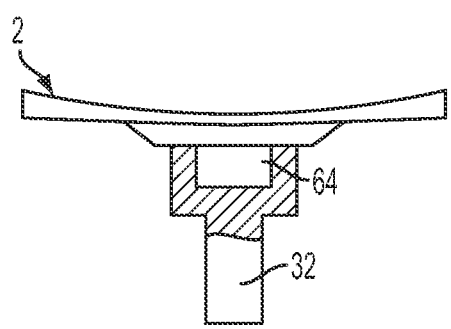
FIG. 8 is a modified embodiment of a holding pin of the apparatus according to FIG. 4.

If at the time at which the lens 2 is to be adhesively bonded to the two connecting elements 8 and 12 the lens holder used during grinding the lens shape is no longer connected to the lens 2, the same lens holder or a similar lens holder 58 can be detachably bonded to the lens 2 and then the holding pin 32 is assembled with said lens holder 58 so that equally the afore-explained configuration of the lens 2, the lens holder 58 and the holding pin 32 shown in the FIGS. 5 and 6 is resulting. Furthermore, lens holders used for grinding the lens shape are known which are not provided with a blind hole concentric to the axis of rotation of the lens holder. In order to be able to use such lens holder for connecting the lens 2 to the holding pin 32, a modified holding pin 32 is applied in which its upper end is adapted to the shape of the lens holder or of a pintle formed at the same such that the holding pin 32 and the lens holder can be assembled. FIG. 8 shows an example hereof in which a lens holder 32 is schematically represented which at its upper end has a recess into which a pintle 64 of a lens holder detachably bonded to the lens 2 is inserted.

The lens holder that serves for connecting the lens to the holding pin 32 can be fixedly connected to the holding pin and it can be considered to be a member of the apparatus.

The holding pin 32 detachably connected to the left lens 2 by means of the lens holder 58 is seated in the bore 30 formed in the frame 24. In this way the holding pin 32 holds the lens 2 in or at the described apparatus and constitutes a member of the holding device thereof for holding the lens 2.

The distance D between the two supporting strips 44, i.e. more exactly speaking, between the support edges thereof is adjusted to the A-dimension K of the lens 2 such that said distance D is substantially equal to the maximum width of the lens 2 corresponding to the A-dimension K minus the mean joining surface width FB of the joining surfaces 14 (cf. FIG. 3). In other words, that is to say that $$D \approx K \cdot mm - FB$$

is applicable.

The holding pin 32 is rotatable and axially movable in the bore 30. This permits to raise and lower the lens 2 held by the holding pin 32 relative to the upper side of the upper plate 26 and thus relative to the working surface of the apparatus and it further permits to rotate the lens 2 about the pin axis 34. The recess 36 has such dimensions that the lens holder 58 arranged in the recess 36 does not hinder these movements, unless they exceed a required degree.

While the rotary position of the lens 2 about the pin axis 34 is such that the center line L thereof extends at least approximately perpendicularly to the direction of extension of the two supporting strips 44, the lens 2 held by the holding pin 32 is lowered until the front side 3 of the lens 2 rests on the two supporting strips 44. The front side 3 of the lens 2 thus faces the supporting strips 44. While the lens 2 rests on the two supporting strips 44, it is preferably pressed downward, which is preferably effectuated by means of the spring-loaded pivot arm 50 of the hold-down member 46.

As far as required, the lens 2 is then manually rotated about the pin axis 24 until the center line L of the lens 2 extends as exactly perpendicularly as possible to the direction of extension of the two supporting strips 44. For this purpose, the auxiliary lines 56 as well as the upper and lower edges of the joining surfaces 22 on the front side 3 of the lens 2 are helpful. After that, the left connecting element of the bridge 6 is pushed between the supporting strip 44 on the right in FIG. 6 and the front side 3 of the lens 2, wherein the joining surface 14 of this connecting element 8 is made to coincide with the associated joining surface 22 at the lens 2. The connecting element of the left lug 10 is pushed between the supporting strip 44 on the left in FIG. 6 and the front side 3 of the lens 2, wherein the joining surface 14 of this connecting element 12 and the associated joining surface 22 at the lens 2 are made to coincide. Then the lug 10 and the bridge 6 can be orientated at the lens 2 and the rotary position of the lens 2 about the pin axis 34 can be re-aligned so as to correctly align the lens 2, the lug 10 and the bridge 6 relative to each other. Thus finally the state shown in the FIGS. 5 and 6 is reached. In this state each of the two connecting elements 8 and 12 is clamped between one of the two supporting strips 44 and the front side 3 of the lens 2, the clamping force depending on the force by which the lens 2 is pressed down by means of the hold-down member 46. This force can be manually supplemented, where appropriate. Because of the afore-explained distance D between the support edges of the two supporting strips 44 each supporting strip presses from below against the respective connecting element 8 or 12 at a position located centrally in the direction of width of the joining surface 14 of the connecting element. It is achieved in this way that each connecting element 8 or 12 automatically adjusts itself such that the pressure between the joining surfaces 14 and 22 associated to each other is substantially constant over the entire area of the same.

While the two connecting elements 8 and 12 are correctly aligned and clamped at their mounting positions in the afore-described manner, liquid adhesive is introduced to the joining gap between the joining surfaces 14 and 22. This can be done, for instance, by means of a hollow needle that is not shown from the direction of an arrow 66 shown in FIG. 5. At least until the initial adhesion is obtained between the connecting elements, on the one hand, and the lens, on the other hand, the force exerted upon the lens 2 from above is maintained. After that, this force is removed and the lens 2 is lifted off the upper plate 26. The holding pin 32, for instance, can be withdrawn from the bore 30 before it is separated from the lens holder 58 and the latter is detached from the lens 2. Thus, a component group consisting of the left lens 2, the left lug 10 and the bridge 6 is finally provided. The right connecting element 8 of the bridge 6 can subsequently be adhesively bonded to the right lens 4 which is moreover adhesively bonded to the connecting element of the right lug. These adhesive bonds at and to the right lens are performed in the same way as this has been explained in the foregoing for the adhesive bonds at and to the left lens 2.

Instead of commencing with the adhesive bonds at the left lens 2, first the adhesive bonds at the right lens can be executed. In this case, the right lens 4 partly shown in broken lines in FIG. 5 is already adhesively bonded to the right connecting portion of the bridge 6, while the adhesive bonds are performed at the left lens 2. In order to avoid interfering moments at the mounting position of the left connecting element 8 of the bridge 6, in this case the right lens 4 is expediently supported on the working surface by means of a pad 68.

The described apparatus can also be used in the way that initially only the connecting element of the bridge or the connecting element of the lug is clamped at the lens by means of one of the supporting strips 44 and is adhesively bonded to said lens, before the other connecting element is clamped at its mounting position and is adhesively bonded to the lens.

The described apparatus is simple as to its structure. It permits an unhindered view to the joining surfaces 14 and 22 as well as the gap there between while the adhesive spreads in said gap so that an exact dosing of adhesive is possible, which contributes to obtaining a permanently tight adhesive connection. Due to the approximately central support of the connecting elements on the supporting strips, the joining surfaces 14 and 22 facing each other are automatically aligned relative to each other such that the gap thickness and the pressure there between are substantially constant in the entire area of the joining surfaces. This improves the quality of the adhesive bond. The connecting elements are held at their mounting position at the lens by the fact that they are clamped between the front side of the lens and one of the supporting strips 44. This fixing of the connecting elements prevents even minimum relative movements between the joining surfaces facing each other during the reaction of the adhesive, which equally contributes to high-quality adhesive bonds.

Since the supporting strips 44 extend straight and in parallel to each other and the supporting edges thereof exhibit the afore-mentioned distance D from each other, the apparatus is suited, as far as described in the foregoing, for bonding spectacle lenses having any lens shape, if the A-dimension K is one and the same.

Figure 7:
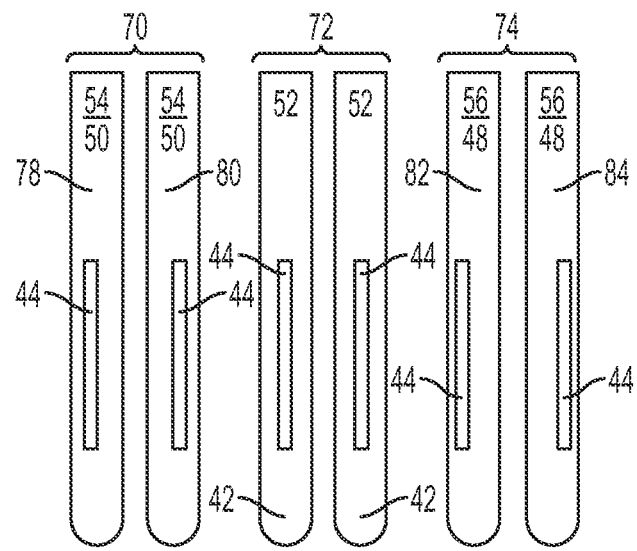
FIG. 7 is a top view onto plural pairs of carriers provided with supporting strips.

In order to render the apparatus suited for lenses of different size, i.e. lenses having A-dimensions K different from each other, it can preferably be provided and is provided in the described embodiment that the apparatus includes plural pairs of carriers, wherein the carriers of one of said pairs are inserted in the recesses 38 depending on the A-dimension K. FIG. 7 exemplifies in a top view three pairs 70, 72 and 74 of carriers, the pair 70 consisting of carriers 78 and 80, the pair 72 consisting of the carriers 42 and the pair 74 consisting of carriers 82 and 84. All carriers 42, 78, 80, 82 and 84 have the same configuration so that each of said carriers is adapted to be fittingly inserted into one of the two recesses 38.

The carriers 42 of the pair 72 are the carriers 42 shown in the FIGS. 4 to 6. In the same the supporting strip 44 disposed at the carrier 42 has the same distance from the longitudinal edge of the carrier on the left in FIG. 7 as from the longitudinal edge of the carrier on the right in FIG. 7. When the carriers 42 of the pair 72 are inserted in the recesses 38, as shown in the FIGS. 4 to 6, the support edges of the supporting strips 44 have a distance D from each other which is suited, for instance, for the A-dimension K=52 as expressed by the legend of the carriers 42 of the pair 72. The carriers 78 and 80 of the pair 70 differ from the carriers 42 of the pair 72 by the fact that the supporting strips 44 are not arranged centrally between the longitudinal edges of the carriers 78 and 80 but are offset towards one of said longitudinal edges. At the carrier 78 the supporting strip 44 is arranged offset from the center towards the left longitudinal edge and at the beam 80 the supporting strip 44 is arranged offset from the center towards the right longitudinal edge. When the carrier 78 is inserted in the recess 38 on the left in the FIGS. 5 and 6 and the carrier 80 is inserted in the recess 38 on the right in the FIGS. 5 and 6, a distance D is resulting between the support edges of the supporting strips which is suited, for instance, for the A-dimension 54 and is adapted to the latter. If, however, the carrier 78 is inserted in the recess 38 on the right in the FIGS. 5 and 6 and the carrier 80 is inserted in the recess 38 on the left in the FIGS. 5 and 6, a smaller distance D is resulting between the support edges of the supporting strips 44 which corresponds to and is associated with an A-dimension K=50, for instance. Accordingly, the two carriers 78 and 80 of the pair 70 are labeled with "50" and "54".

The carriers 82 and 84 of the pair 74 differ from the carriers of the pair 70 in that the supporting strips 44 are offset even further from the center towards a longitudinal edge of the respective carrier than this is the case with the carriers 78 and 80 of the pair 70. The explanations concerning the pair 70 therefore apply mutatis mutandis to the pair 74, wherein the carriers 82 and 84 provided with the supporting strips 44 are designed and suited, for instance, for the A-dimensions K=48 and K=56 indicated on the carriers.

The plural pairs 70, 72 and 74 of carriers thus permit to adapt, by exchanging the carriers of one pair with those of one of the other pairs and by exchanging the carriers of one pair with each other, the described apparatus to the A-dimension K of the lens to which the connecting elements are to be adhesively bonded in a simple manner.

The invention relates to an adhesive bonding apparatus, namely an apparatus for adhesively bonding a spectacle lens of rimless spectacles to connecting elements of a bridge and a lug of the rimless spectacles. The apparatus comprises a cylindrical holding pin arranged to be rotatable about its axis and axially movable in a bore of a frame of the apparatus. The holding pin is designed to centrally hold the lens such that its slightly convex front side substantially extends perpendicularly to the pin axis. In a plane perpendicular to the pin axis two straight supporting strips extend in parallel to each other and on both sides of the pin axis from which the supporting strips are equally spaced apart. The supporting strips are arranged at the frame such that the front side of the lens held by the holding pin faces the supporting strips. The holding pin holds the lens such that the lens can be pressed with its front side towards the supporting strips so that one of the connecting elements is adapted to be clamped between the front side and each of the supporting strips. The apparatus serves for reliably fixing the connecting elements clamped on the front side of the lens while introducing adhesive between joining surfaces provided at the lens and at the respective connecting element and for a certain period afterwards at an automatically aligned correct position.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. An apparatus for adhesively bonding a spectacle lens of rimless spectacles to connecting elements of a bridge and a lug of said rimless spectacles, comprising:
   a frame; and
   a holding device for holding the lens,
   wherein the holding device includes a cylindrical holding pin arranged to be rotatable about its pin axis and axially movable in a bore of the frame and designed to centrally hold the lens such that a front side thereof extends substantially perpendicularly to the pin axis,
   wherein, at the frame, two straight supporting strips are arranged which extend in parallel to each other at a plane perpendicular to the pin axis and are equally spaced apart from the pin axis, said two supporting strips being arranged such that the front side of the lens held by the holding pin faces the supporting strips and one of the connecting elements is adapted to be clamped between said front side and each of the supporting strips,
   wherein each of the supporting strips is arranged or formed at a carrier inserted in a recess of the frame, and
   wherein the apparatus further comprises two or more pairs of carriers, each provided with one of said supporting strips, wherein the carriers of one of the pairs differ from the carriers of another one of the pairs by a position of the supporting strips at the carriers.

2. The apparatus according to claim 1, wherein each of the supporting strips has a cross-sectional profile that is rounded at a portion facing the front side of the lens held by the holding pin.

3. The apparatus according to claim 1, wherein each of the supporting strips is formed by a rod or a tube made of a plastic material.

4. The apparatus according to claim 1, wherein the carrier has a shape of an elongate block.

5. The apparatus according to claim 1, further comprising a hold-down member designed to press the lens held by the holding pin towards the supporting strips.

6. The apparatus according to claim 5, wherein the hold-down member includes a spring-loaded pivot arm having a free end, such that the free end of the spring-loaded pivot arm centrally presses against the lens held by the holding pin when the spring loaded pivot arm is located in a working position.

* * * * *